June 13, 1933.  C. W. VALENTINE ET AL  1,913,525
DRIVING MECHANISM
Filed May 18, 1929  2 Sheets-Sheet 1
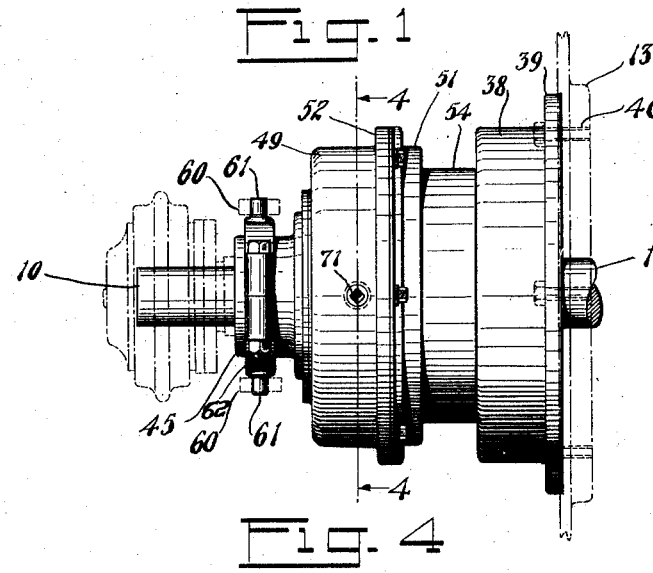
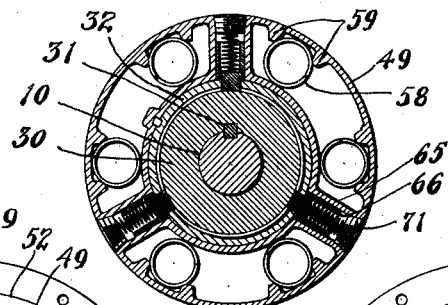
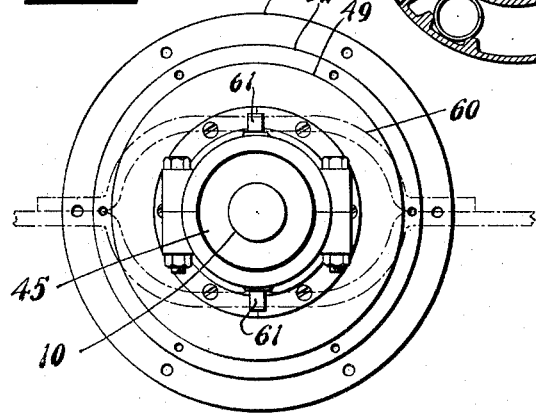
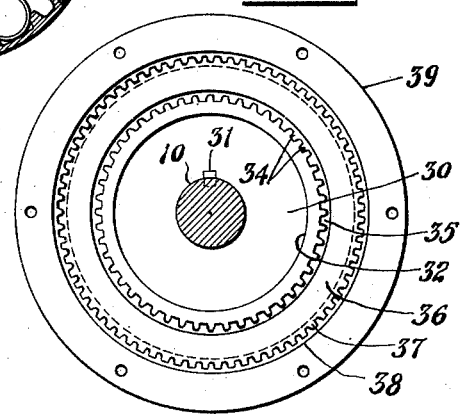
INVENTORS
Charles W. Valentine
Peter M. Ottersland
George A. Fairbanks
BY
ATTORNEYS

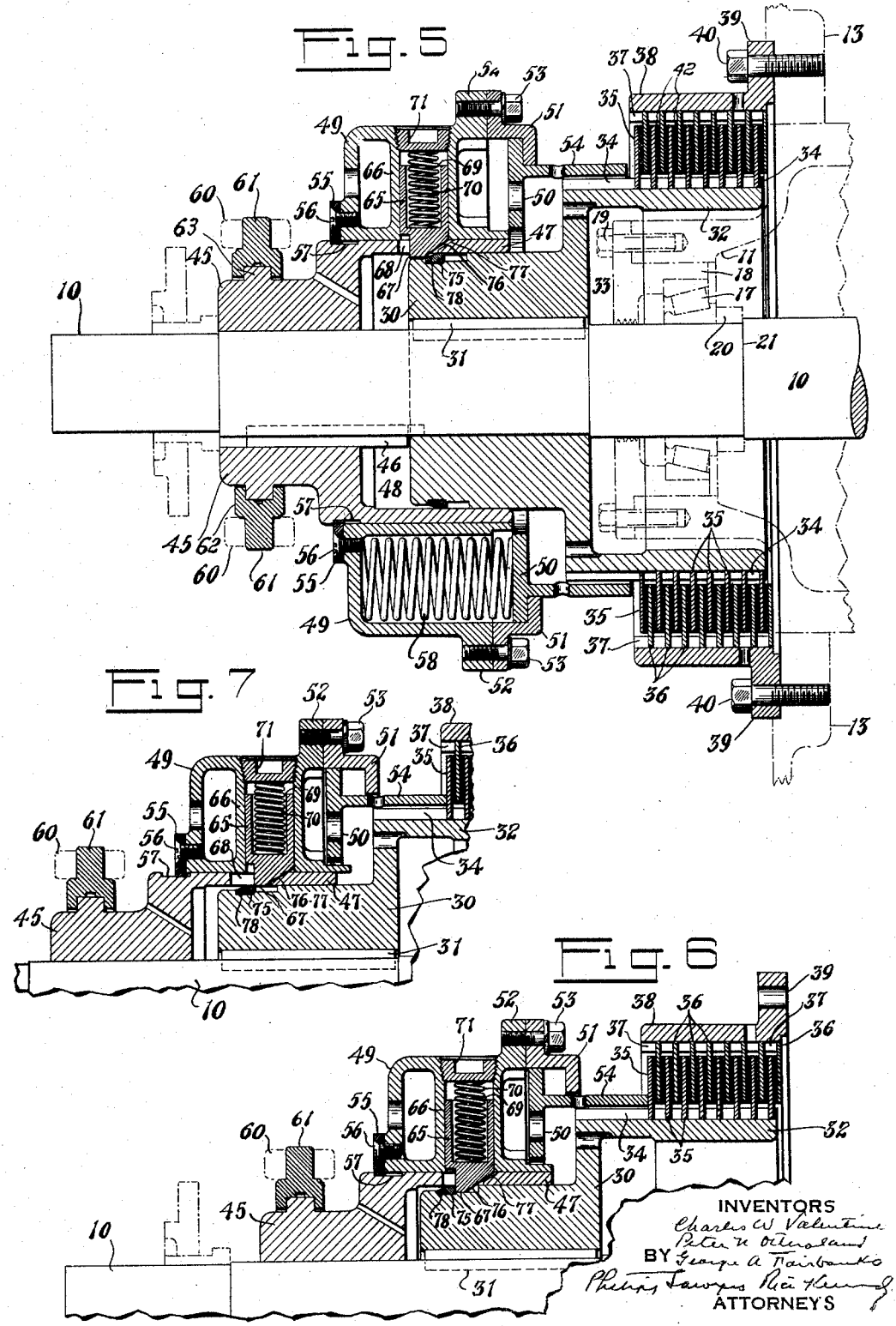

Patented June 13, 1933

1,913,525

UNITED STATES PATENT OFFICE

CHARLES W. VALENTINE, PETER N. OTTERSLAND, AND GEORGE A. FAIRBANKS, OF WATERTOWN, NEW YORK, ASSIGNORS TO THE BAGLEY AND SEWALL COMPANY, OF WATERTOWN, NEW YORK, A CORPORATION OF NEW YORK

DRIVING MECHANISM

Application filed May 18, 1929. Serial No. 364,018.

This invention relates especially to improvements in paper making machinery, but contains features which are adapted for other applications and uses.

In paper making machinery, the web of paper passes successively through the various parts or units of the machine, as the wire, couch roll, press rolls, calenders, etc., and in passing from unit to unit, stretches to some extent. Such stretch is called the "draw" of the web and must be taken care of or there would be an increasing slack in the web between units. In order to obviate the "draw" or slack, each successive unit must be driven a small percentage faster than the preceding unit, and the drives for the various units must be accurately synchronized.

The usual practice in driving the units of the machine is to employ a prime mover for driving a line shaft which extends the length of the machine. Each section is usually driven from the line shaft by means of a belt leading from a cone pulley on the line shaft to a cone pulley on an individual geared drive. The most common form of this latter consists of a cone pulley driving a bevel pinion which in turn drives a bevel gear, the latter being connected to a shaft driving into the respective unit.

This construction, although it worked well enough on the smaller and slower machines of the past, is unsatisfactory in the large and fast modern paper machinery, causing trouble in operation and maintenance.

It is the especial object of the invention to eliminate the defects of prior constructions and to produce a mechanical drive which will be efficient in the operation of large machines, the construction including a self-contained unit with friction minimized, controllable in a convenient and reliable manner, of low cost, efficient in operation and durable in service.

One feature of the invention involves an improved multiple disk clutch for connecting and disconnecting a pulley from its shaft.

The invention further consists in certain arrangements, combinations, and details of construction which will first be described in connection with the accompanying drawings and then more particularly pointed out in the appended claims.

In the drawings:

Figure 1 is a side elevational view of a mechanism constructed in accordance with the present invention;

Figure 2 is an end elevation, looking from the left in Figure 1;

Figure 3 is an end elevation, looking from the right in Figure 1;

Figure 4 is a cross-section, taken as on line 4—4 of Figure 1;

Figure 5 is a longitudinal section (enlarged) of the clutch, with portions of the pulley shown in dotted lines; and Figures 6 and 7 are similar views of portions of the clutch, illustrating different positions of the parts.

The particular mechanism selected to illustrate the invention includes a cone pulley which is mounted on a shaft, 10, and is adapted either to run idly thereon without driving the shaft or to be coupled to the shaft to rotate the same, this pulley being a driven one.

The pulley includes a hub 11 situated on shaft 10, and arms or spokes 13 connecting its rim to said hub. The hub is advantageously made separately and the rims and arms integral and cast as one piece.

Means such as bolts may be provided for fastening the integral rim and arms to the hub 11.

Means are provided for mounting the hub on the shaft to enable it to run idly thereon with minimum friction. In this example, said means embody antifriction bearings, specifically roller bearings 17. The illustrated exemplification shows the bearings positioned at the ends of the hub in flanges 18, the latter being attached to the hub ends as by bolts 19 or other means. The flanges act to enclose the bearings within the hub and to force them against suitable abutments, such as collars, 20, arranged on the shaft. The collars, in turn, are prevented from axial movement on the shaft by their abutments with shoulders 21 thereon. In this way, the hub is mounted on the shaft by antifriction bearings and the latter are enclosed within the hub in fixed positions on the shaft.

The invention includes an improved means for connecting or disconnecting the pulley and shaft, so that the two rotate as a unit or the pulley runs idly thereon. In the embodiment shown, the means embody a clutch and mechanism for operating the same.

While capable of various constructions, in that here shown as an example, the clutch comprises a hub 30 which is fixed to shaft 10 as by a key 31. The outer periphery of the hub is formed as an axially extending rim 32 made hollow as at 33 (Figure 5) so as to house or contain one end of the pulley hub, its flange and bearing. The exterior of said rim is formed with teeth or notches 34 (Figure 3) in which are fitted loosely a series of disks 35 having engaging teeth or notches, said disks being rotatably locked to the hub rim but adapted for sliding axial movement with respect thereto. Another set of disks 36 are interspersed alternately between disks 35. Disks 36 have no locking engagement with the hub but have exterior teeth or notches 37 which interlock in cooperating teeth or notches on the interior of a rim 38 arranged around the disks and housing the same. Between disks 35, 36, friction disks 42 of asbestos or other suitable friction material are positioned. The rim 38 has a radial flange 39 which is attached to certain arms 13 of the pulley (Figure 5) as by bolts 40 or other means. In this way, the rim 38 is caused to rotate as a unit with the pulley and is driven thereby. This rim, in turn, drives the hub 30, hence shaft 10, by friction through the disks 35, 36 and the friction disks between them when the sets of disks are axially forced together and does not drive the hub when the disks are not engaged or forced together. This is the usual multiple disk clutch action. The disks abut the pulley hub (Figure 5) which acts as a stop for the disks.

Means are provided for urging or forcing the disks together axially so as to cause the driven disks 35 to be rotated by the driving disks 36 by friction and for releasing the disks to allow the driving disks to rotate without rotating the driven disks. In this exemplification, said means embody a sleeve 45 located on shaft 10 and slidable axially thereon. The sleeve is preferably held against rotation and fixed rotatably to the shaft by a key 46 which does not affect its axial movement. The sleeve is advantageously formed in part as a rim 47 made hollow as at 48 so as to slip over the clutch hub 30 (Figure 5). Arranged around the periphery of rim 47 is a hollow annular member 49 closed at its end removed from the disks and open at its end nearest to said disks. Within the open end, an annular plate 50 is positioned loosely so as to move axially but retained in the open end by a suitably designed flange 51 which is fastened to a radial rib 52 on the annular member 49 as by bolts 53. The annular plate carries or has integrally formed with it a sleeve-like axial extension 54 which passes over a portion of the periphery of the clutch hub into operative abutting relation with the disks. Annular member 49 is axially fastened to sleeve 45 by a split ring 55 attached to the closed end of said member by suitable attaching elements such as 56 and fitting in a peripheral groove 57 on the sleeve. The groove is slightly wider than the ring to allow a very limited free movement of the annular member and sleeve.

Means are provided for putting the annular plate 50 under spring pressure. In this embodiment, said means are coil springs 58 located within annular member 49 between the closed end of said member and the annular plate 50. In the example shown, the springs are six in number (Figure 4) and are arranged in a circular fashion in the annular member and equally spaced therein. The springs may advantageously be maintained in their positions by studs 59 formed on the interior of the annular member and serving as fingers between which the springs are held.

The sleeve 45 is adapted to be moved back and forth on the shaft and to carry annular member 49 and associated parts with it. To this end, a yoke mechanism 60 (Figure 2) may be employed. The yoke is connected to the sleeve through the medium of studs 61 on a split collar 62 rotatably mounted on a ring 63 integral with sleeve 45. Manipulation of said yoke mechanism imparts axial movement to the sleeve on the shaft.

When the sleeve is moved toward the disks, the annular member is advanced with it and the end of the sleeve extension strikes the end of the interspersed disks and forces said disks together into frictional engagement. The sleeve is advanced to a greater extent than is necessary for the sleeve extension to engage the disks. As a result, the annular member moves forward relative to the sleeve extension (Figures 6 and 7), the springs 58 are compressed and hold the disks in engagement by a pressure equal to the compression pressure of the springs. The compression characteristics of the springs may be designed for a maximum pressure required. When the sleeve is moved back from the disks, it carries the annular member with it and the sleeve extension out of contact with the clutch disks (Figure 5). In this case, the driving disks may rotate freely without communicating rotation to the driven disks.

The invention includes also means for latching the sleeve member in its advanced position or in its retracted position with the clutch in or out. While capable of various constructions, the latching means herein shown embody latching elements 65 which slide radially in hollow radial guides 66 in the annular member. A plurality of the latching elements are preferably employed and are arranged in a circular manner and equally spaced in the annular member (Figure 4), said elements being positioned between compression springs. The latching elements have noses 67 which extend through openings 68 in the rim 47 of the sleeve into engagement with the periphery of the clutch hub. The latches are spring-pressed so that the noses are continually urged against the hub surface. To this end, the rears of the latches are axially recessed at 69 to accommodate coil springs 70 which are compressed as by plugs 71 threaded into the ends of the guides 66. These plugs are removable to permit assembly or removal of the latches and springs.

The latches move with the sleeve and their noses ride on the exterior of the clutch hub and engage in front of or in back of an abutment which may conveniently be a peripheral ring 75 on said hub. When the noses engage in front of the ring (Figure 6), the sleeve is held advanced and the clutch in, and when they engage behind the ring (Figure 5), the sleeve is held retracted and the clutch out. The front corners of the noses are beveled at 76 and cooperate with similar beveled edges 77 on rim 47. Thus, when the sleeve is moved back from the clutching position (Figure 6), beveled edges 77 lift up the latches (Figure 7) and allow them to pass over the ring and behind the same into the retracted position. The rear corner of the ring is also similarly beveled at 78 with the result that when the sleeve is moved forward from its retracted position, the cooperating beveled edges 76, 78, cam the latches up and permit them to ride over the ring and to snap in front of the ring. In this way, the sleeve is latched in its forward and in its retracted positions with the clutch in or out, as the case may be.

The entire assembly presents a compact, self-contained unit and the clutch may be substantially within the shielding influence of the pulley rim carried by spokes 13. The shaft itself may be mounted in bearings of any suitable type, preferably anti-friction, and may drive through suitably designed gears or other mechanism. As these latter features are of optional character, they are merely indicated in dotted lines without detail.

What is claimed is:

1. A clutch construction comprising a rotary driving member, a rotary driven member, a set of disks rotatable with the driving member, a second set of disks rotatable with the driven member and interspersed among the disks of the first set, axially movable means for forcing said disks toward one another or releasing same, and means operated by movement of said axially movable means for latching the forcing means in and unlatching said forcing means from either position.

2. A clutch construction comprising a shaft, a rotary member fixed to said shaft, a set of disks arranged around the rotary member in axial formation and rotatable with said member, a second rotary member around the disks, a second set of disks rotatable with the second rotary member and interspersed axially among the disks of the first set, means operated by movement of said sleeve for forcing said disks toward one another axially or releasing same, said means comprising a sleeve on said shaft, means associated with the sleeve for engaging the end of the group of disks, means for moving the sleeve axially in either direction, and latching means for holding the sleeve in position either with the disks forced toward one another or released, said means being unlatched by axial movement of said sleeve.

3. A clutch construction comprising a shaft, a rotary member fixed to said shaft, a set of disks arranged around the rotary member in axial formation and rotatable with said member, a second rotary member around the disks, a second set of disks rotatable with the second rotary member and interspersed axially among the disks of the first set, means for forcing said disks toward one another axially or releasing same, said means comprising a sleeve on said shaft, means associated with the sleeve for engaging the end of the group of disks, means for moving the sleeve axially in either direction, and latching means for holding the sleeve in position either with the disks forced toward one another or released, said latching means including a spring-pressed latch associated with the sleeve and arranged for radial movement and an axially stationary abutment which the latch engages in front and behind and over which the latch rides to one position or the other.

4. A clutch construction comprising a shaft, a rotary member fixed to said shaft, a set of disks arranged around the rotary member in axial formation and rotatable with said member, a second rotary member around the disks, a second set of disks rotatable with the second rotary member and interspersed axially among the disks of the first set, means for forcing said disks toward one another axially or releasing same, said means comprising a sleeve on said shaft, means associated with the sleeve for engaging the end of the group of disks, means for moving the sleeve axially in either direction, and latching means for holding the sleeve in position either with the disks forced toward one another or released, said latching means including a spring-pressed latch associated with the sleeve and arranged for radial movement and an axially stationary abutment which the latch engages in front and behind, and over which the latch rides to one position or another, said latch, sleeve and abutment having cooperating cam surfaces for lifting the latch up upon movement of the sleeve to allow the latch to pass over the abutment.

5. A clutch construction comprising a shaft, a rotary member fixed to said shaft, a set of disks arranged around the rotary member in axial formation and rotatable with said member, a second rotary member around the disks, a second set of disks rotatable with the second rotary member and interspersed axially among the disks of the first set, an axially movable sleeve unit on the shaft including a hollow annular member, an annular plate at one end of said annular member, springs arranged circularly within said member for pressing the plate axially, and a sleeve-like element associated with the plate for axial engagement with the end of the set of disks, means for moving said unit axially whereby the sleeve-like element may engage or release the disks.

6. A clutch construction comprising a shaft, a rotary member fixed to said shaft, a set of disks arranged around the rotary member in axial formation and rotatable with said member, a second rotary member around the disks, a second set of disks rotatable with the second rotary member and interspersed axially among the disks of the first set, an axially movable sleeve unit on the shaft including a hollow annular member, an annular plate at one end of said annular member, springs arranged circularly within said member for pressing the plate axially, and a sleeve-like element associated with the plate for axial engagement with the end of the set of disks, means for moving said unit axially whereby the sleeve-like element may engage or release the disks, radially movable spring-pressed latches within the annular member and disposed in circular formation, and axially stationary ring over which said latches ride and in front and behind which they engage, and beveled surfaces to cam the latches up from engagement in front of and behind the ring.

7. A clutch construction comprising a shaft, a hub fixed to said shaft, a set of disks arranged around the hub in axial formation and rotatable with said hub, a rotary member around the disks, a second set of disks rotatable with the rotary member and interspersed axially among the disks of the first set, a sleeve on the shaft having a rim-like axial extension for passing partially over the hub, a hollow annular member around said rim-like extension and connected to same axially, an annular plate at one end of said annular member, springs arranged circularly within the annular member for pressing the plate axially, a sleeve-like element associated with the plate for axial engagement with the end of the set of disks, means for moving the sleeve axially whereby the sleeve-like element may engage or release the sets of disks, radially movable spring-pressed latches within the annular member and disposed in circular formation, said latches having noses extending through openings in the rim-like extension into contact with the hub surface, a ring on the hub surface in front and behind which the noses engage and over which they ride, said noses, ring, and openings having beveled surfaces for lifting up the latches from in front and behind the ring upon movement axially of the sleeve, and means for moving the sleeve axially in either direction.

In testimony whereof, we have hereunto set our hands.

CHARLES W. VALENTINE.
PETER N. OTTERSLAND.
GEORGE A. FAIRBANKS.